June 21, 1938.  A. L. OSROW  2,121,444
ELECTRIC COOKER AND TOASTER
Filed March 19, 1936  2 Sheets-Sheet 2
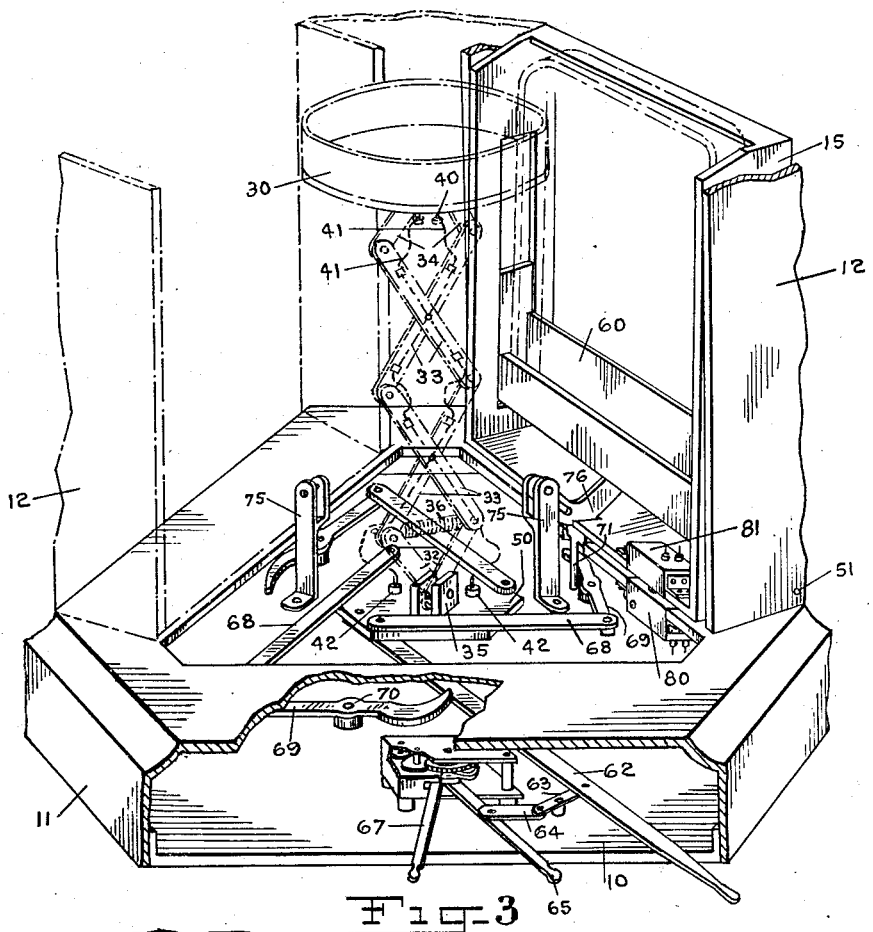
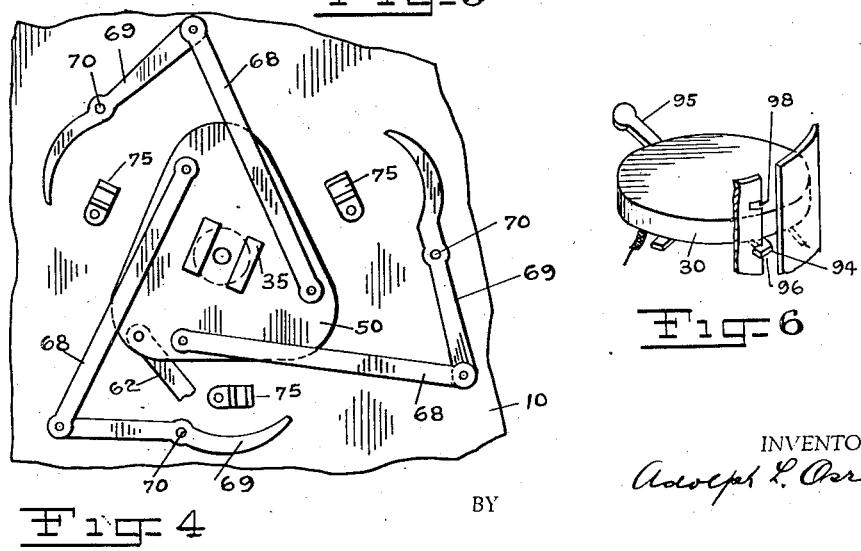
INVENTOR.
Adolph L. Osrow Patented June 21, 1938

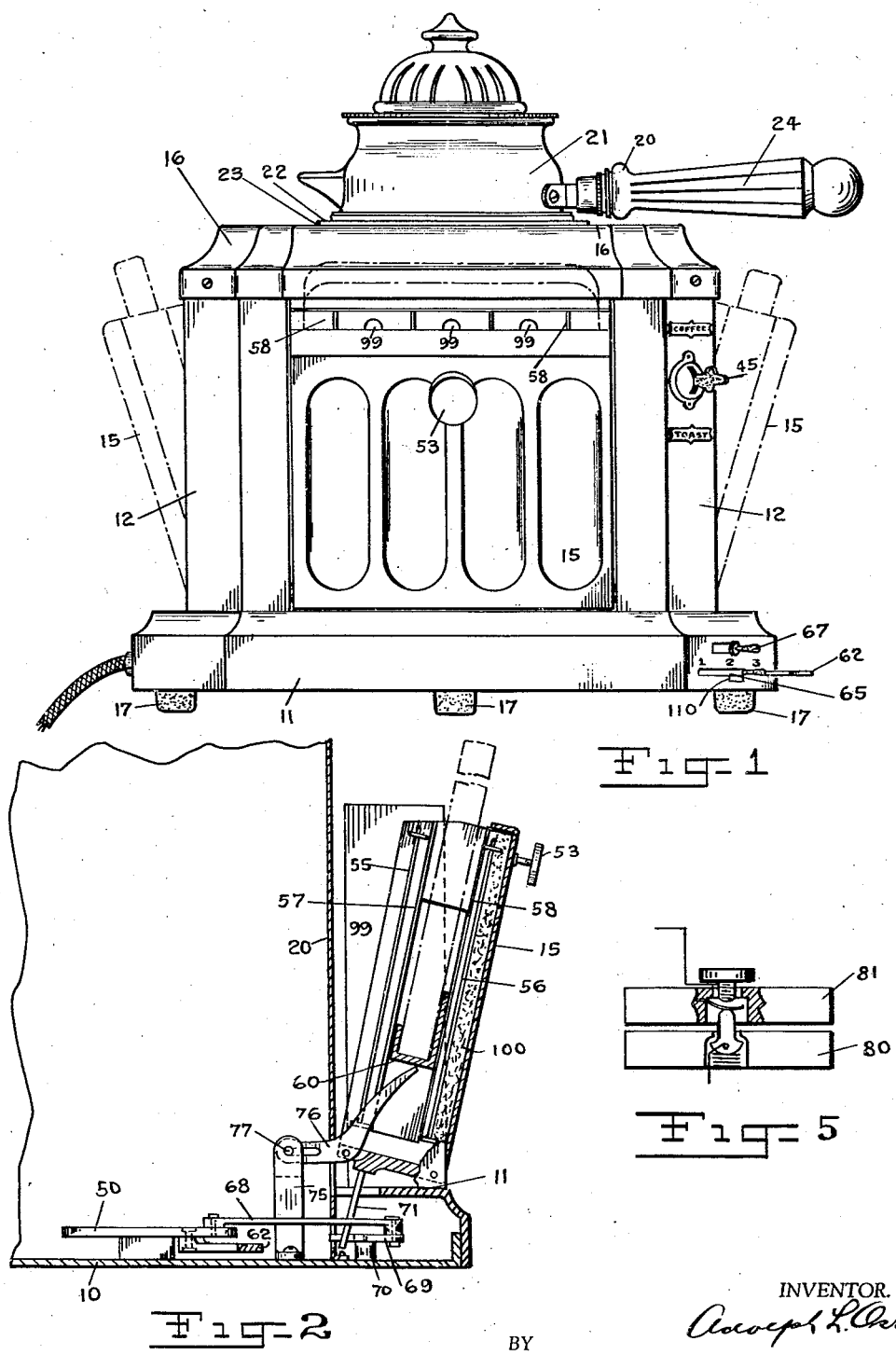

2,121,444

UNITED STATES PATENT OFFICE 2,121,444

ELECTRIC COOKER AND TOASTER

Adolph L. Osrow, New York, N. Y.

Application March 19, 1936, Serial No. 69,621

19 Claims. (Cl. 219—19)

The invention relates to cookers and toasters, and more particularly to an electrically operated device of this character which combines in its construction a toaster, a grill, and a percolator or other cooking utensil.

One of the principal objects of the invention is to provide a device of this character of such construction that it may be used either as a toaster or as a grill or as a percolator or the like.

Another object of the invention is to provide such a device which may be either used individually for one purpose at a time or in which bread may be toasted while coffee is being made or chops, cereal or other articles cooked upon the grill.

Another object of the invention is to so arrange the parts of the device that bread may be set in place, toasted, and the toast removed, without disturbing a coffee pot or other utensil resting upon the grill, and at the same time permit the current to the heating unit of the grill to be shut off when no longer needed and the contents of the pot or pan kept hot by heat retained in the grill as well as by the heat radiating from the toaster elements. By this arrangement, coffee remaining in the pot may be kept hot until wanted and slices of bread at the same time toasted as they are needed while a meal is being eaten.

Another object of the invention is to provide such a device in which the cooking of the contents of a pot or pan on the grill may be completed after the current has been shut off from the grill, due to the heat retained in the grill and confined by the central shell of the device.

Another object of the invention is to provide such a device in which the grill may be located within a vertical shell serving to retain a coffee pot or the like in an upright position and prevent the danger of its being accidentally upset.

Another object of the invention is to provide a device in which the grill may be vertically adjusted in such a shell from a raised position close to the upper end of the shell for use when frying eggs or the like, to a lowered position in which a coffee pot may be set upon it within the shell or to an intermediate position in which a pot may be set upon the grill (also within the shell) for cooking cereal, poaching eggs, or the like.

Another object of the invention is to provide a device in which such vertical adjustment of the grill may be automatically accomplished.

Another object is to provide the device with shields or doors which may be moved into or out of a closed position and not only hold slices of bread in operative relation to the toaster but also serve as means for directing heat from the heating units of the toaster inwardly toward the shell and thus keep the contents of a utensil upon the grill within the shell from losing its heat.

Another object is to provide movable supporting means for bread being toasted, whereby its movement relative to the heating unit of the toaster produces an even toasting effect.

Another object is to provide means whereby the circuit through which current flows to the toasting elements is automatically broken in each individual containing device or oven for the toast when the same is open, and automatically closed (provided the switch is also set to provide current to the toasters) when such oven is placed in closed or operative position.

Another object is to so arrange such a device that the current may be automatically shut off just before the completion of the toasting.

Another object is to provide a device of the character referred to which is simple, compact and convenient in construction, and attractive in appearance.

Another object is to provide such a device which is economical in the use of electric current.

Another object is to provide such a device which shall be simple and efficient in operation, and not easily liable to get out of order or become inoperative for any reason.

Another object is to provide a device in which the toasting ovens may be operated to open the same by manual movement of the levers hereinafter referred to, instead of by timing mechanism, when desired.

Further objects and advantages of the invention will be in part set forth in the following specification, and in part will be obvious therefrom without being specifically pointed out, the same being realized and attained by means of the instrumentalities and structural characteristics and relative arrangements and combinations which will be hereinafter more fully described, or which will be pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in this specification.

In the accompanying drawings,

Fig. 1 is a side elevation of a combined toaster, grill and percolator constructed according to one embodiment of my invention;

Fig. 2 is a fragmentary view, partly in section, illustrating the means whereby the moving means comprised in the toasters are operated;

Fig. 3 is a view showing certain parts of the interior construction of such a device;

Figs. 4 and 5 are detail views hereinafter more fully referred to, and

Fig. 6 is a view showing a modification of certain features of the invention.

In carrying my invention into effect in the embodiment thereof illustrated in Figs. 1 to 5, inclusive, of the accompanying drawings, it will be seen that I provide a body, which comprises a base composed of the plate 10 and member 11, corner members 12 mounted thereon and to which are pivoted the toasting ovens 15, a top 16, and an inner cylindrical shell 20 (see Fig. 2). Feet 17 support the base plate 10, these feet being formed preferably of insulating and non-scratching material for the protection of the table upon which the device is being used.

Referring more particularly to Fig. 3, it will be seen that the body and base are substantially triangular in horizontal section, that is to say, three toasting ovens are provided, although it will be understood that a greater or less number of ovens may be provided as desired, and the size and shape of the device modified accordingly.

The interior shell 20 is of convenient height and diameter to accommodate a coffee pot 21, which is illustrated and referred to as a percolator, but which may be, of course, of any type desired. This pot 21 may be provided with a flange 22 which rests upon the top 23 of the shell 20. A handle 24 extends radially from the pot, being of such length that it will project far enough beyond the body of the device to be conveniently grasped and the pot removed without danger of the user's hand being burned by contact with the pot or other portions of the device.

In order to provide heat for the coffee pot, or for such other utensil as may be used in place thereof, as elsewhere more fully referred to, there is provided a grill 30, which is circular in shape to correspond with the form of the shell. This grill is slidable vertically in the shell and is provided with automatic means for holding the same in the highest position which may be permitted by the type of pan or pot which is in use at any given time. As illustrated in Fig. 3 of the drawings, the said means comprise a series of links designated 32, 32, 33, 33, 33, 33, 34, 34, which are pivotally connected to the member 35, to each other and to the grill, in a manner which will be plain from the drawings without further explanation. A spring 36 tends to draw said links 32—34 into a parallel and vertical position, to such extent as is possible at any given time. It will thus be readily understood that the grill will be lowered to a position very near to the base of the device when a deep coffee pot is in use, by the weight of the pot and contents if any, but that if a pot of less height, for cereals or the like, is used, the grill will automatically rise to correct position for such purpose, and that if a flat pan for frying or the like upon the top of the device is used, the grill will automatically rise to the top of the shell.

It will of course be understood that a pot which is used within the shell, may be provided with a flange or other means for supporting the same upon the upper edge of the shell and holding the same level relatively to the shell.

The heating means for the grill consists of a heating wire or the like, of conventional or any suitable arrangement, embedded in the grill and having terminals 40 to which are secured conductors 41. The latter are shown supported upon the links 32—34, and their lower ends secured at 42 to the plate 50 hereinafter described. It will be understood that these conductors are also connected with the switch 45 (see Fig. 1), although for the sake of simplifying the drawings such connection is not illustrated. It will also be noted that these conducting wires 41 are of such length as to permit the rising and falling of the grill above referred to.

In order to permit one or more pieces of bread to be toasted, there are provided toasters which are mounted in the side openings of the body.

Referring to Figs. 1 and 3, it will be seen that each of these toasters consists of an oven 15, pivotally mounted at 51 between two of the corner sections 12 of the body. This oven comprises a bottom, an outer face, a handle or button 53 being provided for convenience in closing the same, end or side walls, and a partial top, as indicated, which does not, however, extend over the bread being toasted.

The outer face of the oven may be lined with asbestos or the like, designated 100, and an inner wall of mica or the like may be provided, which may have slots 99 to permit heat to be reflected toward the shell.

Within the oven are mounted elements 55 and 56, and wires 57 and 58 for supporting and guiding the bread being toasted (see Figs. 1, 2 and 3). Between the wires is mounted a vertically slidable shelf 60, which supports the lower edge of the slice and operates in a manner hereinafter more fully described.

Near the centre of the bottom plate 10 is mounted the plate 50. This is rotatable to a sufficient degree to operate the attached links and levers about to be described, and is itself operated by means of the link 62. The latter is operatively connected to a timing clock which may be of any type suitable for the purpose. The operation of the clock as shown is such that movement of the lever 65 (see Figs. 1 and 3) to the right will wind the spring of the clock, and at the same time will rotate the plate 50 a short distance in a clockwise direction. This is accomplished by means of link 63, which is pivotally mounted upon the base plate 10 and connected at one end to link 62, and a second short link 64 which connects link 63 to lever 65.

Upon the lever 65 being released and allowed to move to the left by the force of the clock spring, the link 62 is drawn forward by means of connected links 63 and 64, and the plate 50 is gradually rotated in a counterclockwise direction until the clock runs down. The length of time so occupied may be varied by means of the timing lever indicated at 67 in Figs. 1 and 3, in the conventional or any suitable manner, which forms no part of the present invention and therefore need not be here described.

Links 68 are attached to the plate 50, and are pivotally connected to levers 69. The latter are pivotally mounted at 70 on the base plate 10, and their outer or free ends are preferably curved or shaped approximately as shown. These levers act upon pins 71 which extend downwardly from the bottoms of the ovens 15. It will therefore be seen that upon the plate 50 being rotated in a clockwise direction as just above described, the free ends of levers 69 will act upon the pins 71 in the manner shown in Fig. 2, drawing same toward the centre of the device and thus gradually tilting the oven 15 into its open position, as there shown.

It will be seen that the lever 62 is also extended outwardly as a handle, in order that the same may be manually operated if desired. This is convenient, for instance, in demonstrating the device for sale.

By reference to Fig. 1 it will be seen that the slot in member 11 through which the lever 65 projects, is downwardly widened at the right hand end, forming a shoulder 110 against which the lever 65 may abut if slightly depressed, thus preventing the operation of the clock. It will be understood that this should be done before closing the toasting ovens, otherwise the interference of levers 69 and pins 71 would tend to bend or break the latter. As soon as the door is closed (and current consequently flowing to the toaster elements, as hereinafter referred to), the lever 65 may be released from the shoulder 110 and allowed to move to the left to time the toasting.

Uprights 75 are also provided, secured to the base plate 10. A lever 76, of the form best shown in Fig. 2, is pivotally mounted in a notch at the inner edge of the bottom of each oven. The inner ends of these levers 76 are slotted, and through said slots pass pins 77 which extend across the forked upper ends of uprights 75, thus providing sufficient play for the operation of said levers. The outer ends of said levers bear against the under sides of the toast-shelves 60.

It will thus be seen that when the pin 71 is drawn inwardly by the lever 69, and the oven thereby gradually opened, the lever 76 will at the same time exert a gradual lifting action upon the shelf 60, so that at the moment of the completion of the toasting, the slice will occupy the position indicated in dotted lines in Fig. 2.

Referring now more particularly to Fig. 3, it will be seen that connections are provided whereby the electric circuit which supplies heat to the elements of each individual oven, is automatically closed and the element thereby heated, if the oven itself is closed, and is automatically broken after the oven has been gradually opened to a certain extent. That is, the circuit is closed only when the oven is in closed position, as indicated in Fig. 3, by the contact switch 80—81. While the bread is being toasted, the oven is starting gradually to open, and by the time the slice is evenly toasted the door is fully opened and the circuit broken. As above described, the oven is automatically opened when the desired time has elapsed. This is preferably just before the completion of the desired degree of toasting, that is to say, the circuit is broken, and the toasting is completed by means of the heat persisting in the element.

The means by which the circuit to the oven is broken or closed, should therefore be such that the break will not occur immediately as the oven starts to open, but will occur before the completion of the toasting. This may be accomplished, for instance, by means of a resilient contact means such as is illustrated in Fig. 5, or in any other suitable manner. The particular means employed form no essential part of the present invention and need not, therefore, be described in detail.

The door is not, however, automatically closed at the beginning of the toasting, but is closed by hand, and it is therefore possible to operate only such number of the ovens as may be desired, the other one or two being left open if the same are empty and consequently no current being supplied to the same, thus contributing to the economical operation of the device.

It will be understood that the wires leading to the elements 55 and 56 are attached to the switch member 81 and that the wires starting from the switch member 80 lead to the main switch 45, and that therefore the circuit leading from the switch to the heating elements of any one oven is automatically broken as soon as and as long as that particular oven is opened to a predetermined extent, but is again closed when the oven is pushed in by hand as shown in Fig. 3, provided, of course, that the three-way switch 45 is set to provide current to the toasters.

The switch 45 (see Fig. 1) is preferably adapted to selectively control the flow of current to either the toasting means or the grill. It is, however, possible to toast and cook at the same time, because of the fact that the grill retains heat and will continue to cook after the current has been cut off. Furthermore, due to the confined air in the shell, the grill does not lower its heat and thus can still be used at the same time as the toasters. The heat deflected inwards from the toasting ovens toward the shell 20 also aids in either cooking the contents of the central pot or pan, or in keeping the contents hot if the cooking has been completed.

In the modification illustrated in Fig. 6, I have shown a grill which is adjustably mounted in the shell, and provided with means for supporting the same at such height as may be desired, instead of the automatic adjusting means already described. This grill is slidable vertically in the shell and carries tongues 94 and a handle 95 which projects radially from the grill and are received in slots 96 formed vertically in the shell and spaced from each other circumferentially thereof. The handle also extends through a slot 97 formed vertically in the body of the device. Only one of the vertical slots is illustrated in Figs. 6 and 3 but it will be understood that any suitable number may be provided as desired. Side notches or recesses 98 are provided in vertical spaced relation to each other, whereby the grill may be shifted and adjusted vertically in the shell by grasping the outer end of its handle and the handle then moved transversely to rotate the grill and cause the handle and tongues to engage with or be disengaged from the side notches, thus permitting the grill to be raised or lowered and then supported in the desired position.

Vertical plates may be provided upon the handle and one or more of the tongues, if desired, to prevent tilting of the grill, so that it will slide easily from one position to another and not be liable to become stuck.

It is believed that the operation of both of the above described forms of the invention will be clear from what has been said in connection with the construction of the same. It will be understood that in the first described embodiment, the adjustment of the grill is entirely automatic. The adjustment of the modified form has also been explained. The operation of the toasters is such that upon a slice of bread being placed in the toasting oven, and the same closed by hand, the current at once heats the toasting elements, and the lever 65 is at the same time released and the clock allowed to operate. The outer closure of the oven is substantially airtight, when in the position shown in Fig. 3. As the oven gradually opens, the circuit is broken. The toasting continues, however, due to the confined hot air and the heat retained in the elements. At the same time the toast is pushed upwards by the action of the levers above described. At the completion of the toasting, the door is completely open, the circuit broken and the toast projects, in a convenient position to be removed without danger of burning the fingers.

In Fig. 3 I have shown the link 62 extended so that the same may be operated by hand if desired instead of by means of the clock as above described.

Many of the advantages of the invention have already been herein referred to. It will be seen that I have provided a combination toaster, grill and percolator or the like, which is compact in its construction and very attractive in its appearance, as well as economically operated. I have further provided a device of this character by means of which coffee may be made and bread toasted at the same time, by means of current flowing to heating units of a toaster while heat is still retained in the grill upon which the coffee pot rests.

I have further provided a combination cooker wherein flow of current to toasters and a grill may be independently controlled whereby the devices may be operated in unison or one turned on or off irrespective of the other, and in addition I have so arranged the toasters with respect to the grill that a coffee pot in place upon the grill may be kept hot by heat radiating from the toaster after the flow of current to the heating unit of the grill has been shut off. In addition there has been provided a cooker having a grill so mounted in a vertically disposed cylinder or shell that it may be moved therein from a lowered position, in which a coffee pot, stew pan or other deep utensil or pot may be set in place upon the grill and prevented from tipping over, to a position close to the upper end of the shell to permit chops or other articles to be cooked, or to an intermediate position, as may be desired. Furthermore, the adjustment of said grill may be accomplished automatically.

The toasting portions of the device are not only automatic but produce a very evenly toasted product, which is presented in convenient position for removal when finished. Further advantages have also been referred to above.

I do not limit myself to the particular details of construction set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described my invention, what I claim as new and desire to secure by Letters Patent is as follows:

1. A combined cooker and toaster comprising a shell defining a chamber open at its top, a bottom for said chamber, having an electrically energized heating unit associated therein, said bottom being adjustable in the chamber from a position adjacent its upper end for use as a grill to a lowered position for supporting a utensil in an upright position thereon within the chamber, means for adjusting said bottom vertically and retaining the same in an adjusted position, a toaster permanently mounted adjacent a side portion of said shell and having an electrically energized heating unit, and means for selectively controlling flow of current to the heating units of the toaster and bottom.

2. A combined cooker and toaster comprising a body, a shell extending vertically in said body for the full length of the latter and defining a chamber open at its upper and lower ends, a grill in said chamber adjustable vertically therein from a position adjacent its upper end for use as a grill to a lowered position and when lowered adapted to support a cooking utensil with the shell retaining the utensil upright upon the grill, an electrically energized heating unit for said grill, a toaster permanently carried by said body and supported in an upright position adjacent a side of said shell and having an electrically energized heating unit, said toaster when in operation serving to heat the chamber from the side, and conductors leading to the heating units and having switches for selectively controlling flow of current to the heating units.

3. A combined cooker and toaster comprising a body, a shell extending vertically in said body for the full length of the latter and defining a chamber open at its upper and lower ends, a grill in said chamber adjustable vertically therein from a position adjacent its upper end for use as a grill to a lowered position and when lowered adapted to support a cooking utensil with the shell retaining the utensil upright upon the grill, an electrically energized heating unit for said grill, said body having side walls spaced from said shell and formed with openings, toasters mounted vertically in said body and exposed through openings of its walls, the toasters having electrically energized heating units, means for holding bread to be toasted against the toasters and means for selectively supplying current to the heating units of the toasters and grill.

4. A combined cooker and toaster comprising a body, a shell extending vertically in said body for the full length of the latter and defining a chamber open at its upper and lower ends, an electrically heated grill adjustable vertically in said shell, and electric toasters carried by said body about the shell and serving as auxiliary heaters for the shell.

5. A combined cooker and toaster comprising a body, a shell extending vertically in said body for the full length of the latter and open at its upper and lower ends, an electrically heated grill located in said shell whereby a utensil may be set upon the grill within the shell and be retained upright upon the grill by the shell and an electric toaster carried by the body adjacent a side portion of the shell and serving as an auxiliary heater for a utensil resting upon the grill.

6. A combined cooker and toaster comprising a body, a shell extending vertically in said body for the full length of the latter and open at its upper and lower ends, an electrically heated grill located in said shell whereby a utensil may be set upon the grill within the shell and be retained upright upon the grill by the shell and an electric toaster permanently carried by the body adjacent a side portion of the shell and serving as an auxiliary heater for a utensil resting upon the grill, and means for supporting bread to be toasted in operative relation to the toaster constituting a reflector for directing heat from the toaster towards the shell.

7. In a device of the character described, a body having a top and bottom and a shell extending vertically in the body with its ends open and exposed through the top and bottom thereof, a grill in said shell adjustable vertically therein, radially extending means carried by said grill for engaging portions of walls of the shell to guide vertical movement of the grill and releasably support the grill in an adjustable position, a heating coil for said grill, a switch carried by said body and conductors leading from said switch and extending into the shell through its open lower end and connected with said coil, the conductors being of sufficient length to permit the grill to be shifted from the lower end of the shell to the upper end thereof.

8. In a device of the character described, a body having a top and bottom and a shell extending vertically in the body with its ends open and exposed through the top and bottom thereof, and an electric grill in said shell, slidable vertically therein and provided with a handle and tongues projecting from its margins, said shell being formed with vertical slots receiving the tongues and handle and the body having a side wall formed with a vertical slot through which the handle extends whereby the handle may be grasped and the grill shifted vertically in the shell, said tongues guiding movement of the grill and the slots having side recesses to receive the tongues and handle and support the grill in adjusted positions.

9. In a combined cooker and toaster, an open ended elongated shell forming from its top a pot receiving chamber, a bottom for said chamber movable vertically in said shell and carrying means engaged through slots formed in side walls of the shell to guide movement of the bottom and support the bottom in vertically adjusted positions, heating elements carried on said bottom and toasting means mounted externally of and adjacent said shell.

10. In an electric cooking device, an open ended shell forming from its top a pot receiving chamber, a bottom for said chamber movable vertically in said shell to accommodate pots of varying depths, means directly carried by the bottom for manually adjusting said bottom vertically in the shell, said means being engageable with portions of the shell for supporting the bottom in various positions in said shell, and electric heating elements associated with said bottom.

11. In a combined cooker and toaster, a shell defining a chamber open at its top, an electrically heated grill movably mounted to permit vertical adjustment in said shell, means in said chamber for automatically raising said grill to accommodate various cooking utensils, and toasting means mounted externally of and adjacent said shell.

12. In a combined cooker and toaster, an elongated shell forming from its top a pot-receiving chamber, a bottom for said chamber movably mounted to permit vertical adjustment in said shell, means for automatically raising said bottom to such height as may be permitted by a cooking utensil supported by said pot receiving chamber, heating means carried by said bottom, and toasting means mounted externally of and adjacent said shell.

13. A combination cooker and toaster comprising a body, a shell extending vertically, a grill movable vertically in said shell, heating means for said grill, means for automatically raising said grill to such height as may be permitted by a cooking utensil supported by said shell, a toasting oven pivotally mounted externally of said shell, movable slice-supporting means in said oven, toasting means within said oven, means adapted to gradually open said oven, means adapted to move said slice-supporting means as said oven opens, and means adapted to cut off the supply of heat to said toaster at a predetermined point in said opening movement.

14. A bread toaster comprising a body, a toasting oven pivotally mounted with relation to said body, movable slice-supporting means in said oven, heating means in said oven, means adapted to move said oven gradually from closed to open position during the toasting operation, and means adapted to operate said movable slice-supporting means, said moving and operating means comprising a pin or finger upon said oven, a lever adapted to bear against the same, a rotatable member mounted in said body, a link connecting said lever and said rotatable member, means adapted to rotate said rotatable member, a second lever fulcrumed in said oven, one end of which bears against said movable slice-supporting means, and a fixed member adapted to engage the opposite end of said second-named lever.

15. A bread toaster comprising a body having an opening in its side wall, a toasting compartment pivotally mounted in said opening, heating means, an opening in the top of said toasting compartment adapted to be enclosed within said body when said compartment is in closed position and to be exposed when said compartment is open, movable slice-supporting means in said compartment, timing mechanism adapted to open said compartment, and means controlled thereby adapted to raise said slice-supporting means and thereby cause an edge of a slice of toast to project through said top opening.

16. A combination cooker and toaster comprising a body, a shell extending vertically, a grill movable vertically in said shell, electric heating means for said grill, automatic adjusting means for said grill, a plurality of toasting ovens pivotally mounted externally of said shell, vertically movable slice-supporting means in said ovens, electrically energized toasting elements in said ovens, means adapted to gradually open said ovens, means adapted to raise said slice-supporting means as said ovens are opened, means for selectively controlling the flow of electric current to said grill or said toasters, conductors extending to said toasters respectively independently of each other, means whereby the circuit to each said oven respectively is broken at a predetermined point in the opening movement of said ovens, and timing mechanism controlling said movable ovens.

17. In a combined cooker and toaster, a shell defining a chamber open at its top, an electrically heated grill movable vertically in said shell, a link and spring assembly adapted to adjust said grill to accommodate various cooking utensils, and toasting means mounted externally of and adjacent said shell, and adapted to furnish auxiliary heat thereto.

18. In a combined cooker and toaster, an elongated shell forming from its top a pot-receiving chamber, a bottom for said chamber, movably mounted to permit vertical adjustment in said shell, a link and spring assembly adapted to raise said bottom, heating means carried by said bottom, and toasting means mounted externally of and adjacent said shell and adapted to furnish auxiliary heat thereto.

19. A combination cooker and toaster comprising a body, a shell extending vertically, a grill movable vertically in said shell, heating means for said grill, a link and spring assembly adapted to adjust said grill, a toasting oven pivotally mounted externally of said shell, movable slice-supporting means in said oven, toasting means within said oven, means adapted to gradually open said oven, means adapted to move said slice-supporting means as said oven opens, and means adapted to cut off the supply of heat to said toaster at a predetermined point in said opening movement.

ADOLPH L. OSROW.